(12) United States Patent
Jain

(10) Patent No.: US 8,929,666 B2
(45) Date of Patent: Jan. 6, 2015

(54) METHOD AND APPARATUS OF GENERATING A MULTI-FORMAT TEMPLATE IMAGE FROM A SINGLE FORMAT TEMPLATE IMAGE

(71) Applicant: Samsung Electronics Co., Ltd., Suwon-si, Gyeonggi-do (KR)

(72) Inventor: Gaurav Kumar Jain, Bangalore (IN)

(73) Assignee: Samsung Electronics Co., Ltd (KR)

( * ) Notice: Subject to any disclaimer, the term of this patent is extended or adjusted under 35 U.S.C. 154(b) by 141 days.

(21) Appl. No.: 13/628,943

(22) Filed: Sep. 27, 2012

(65) Prior Publication Data

US 2013/0083998 A1   Apr. 4, 2013

(30) Foreign Application Priority Data

Oct. 1, 2011   (IN) .............................. 3411/CHE/2011
Aug. 22, 2012   (KR) ........................ 10-2012-0091735

(51) Int. Cl.
*G06K 9/62* (2006.01)
*G06K 9/36* (2006.01)
*H04N 1/60* (2006.01)
*G06K 9/46* (2006.01)

(52) U.S. Cl.
CPC .................................. *H04N 1/6058* (2013.01)
USPC .......................................... 382/209; 382/233

(58) Field of Classification Search
CPC ........................... H04N 19/00; H04N 2209/00
USPC ................. 382/162, 164, 165, 167, 209, 233; 345/589, 590; 358/515, 518, 523, 525, 358/530; 715/705; 386/281

See application file for complete search history.

(56) References Cited

U.S. PATENT DOCUMENTS

| | | | | |
|---|---|---|---|---|
| 5,909,570 | A * | 6/1999 | Webber | 703/13 |
| 6,016,380 | A * | 1/2000 | Norton | 386/281 |
| 7,299,415 | B2 * | 11/2007 | Opheim et al. | 715/705 |
| 2005/0270304 | A1 * | 12/2005 | Obinata | 345/604 |
| 2010/0091096 | A1 | 4/2010 | Oikawa et al. | |
| 2010/0118748 | A1 | 5/2010 | Pratt et al. | |
| 2011/0229035 | A1 | 9/2011 | Sohma et al. | |
| 2011/0307522 | A1 * | 12/2011 | Futty et al. | 707/802 |
| 2013/0083998 | A1 * | 4/2013 | Jain | 382/165 |

FOREIGN PATENT DOCUMENTS

| | | |
|---|---|---|
| CN | 102073976 | 5/2011 |
| GB | 2478845 | 9/2011 |

* cited by examiner

*Primary Examiner* — Amir Alavi
(74) *Attorney, Agent, or Firm* — The Farrell Law Firm, P.C.

(57) ABSTRACT

A method and apparatus are provided for generating a multi-format template image by an image-processing device. At least one pre-defined region in a template image having a first format is identified. Component information of the at least one pre-defined region is extracted by decoding the template image. Pixels associated with the at least one predefined region are converted from the first format to a second format, with reference to the component information of the at least one pre-defined region, to form the multi-format template image.

17 Claims, 5 Drawing Sheets

METHOD AND APPARATUS OF GENERATING A MULTI-FORMAT TEMPLATE IMAGE FROM A SINGLE FORMAT TEMPLATE IMAGE

PRIORITY

This application claims priority under 35 U.S.C. §119(a) to an Indian Patent Application filed in the Indian Patent Office on Oct. 1, 2011 and assigned Serial No. 3411/CHE/2011, and a Korean Patent Application filed in Korean Intellectual Office on Aug. 22, 2012 and assigned Serial No. 10-2012-0091735, the content of each of which is incorporated herein by reference.

BACKGROUND OF THE INVENTION

1. Field of the Invention

The present invention relates generally to the field of image processing, and more particularly, to the conversion of a template image.

2. Description of the Related Art

Different applications require image processing in different formats. Generally, an image in a Joint Photographic Experts Group (JPEG) format, or other formats, is processed by decoding the image into a raw data format (e.g., a Red Green Blue (RGB), YUV, or Hue, Saturation and Value (HSV) color space) based on an application type. Different raw data formats have different characteristics and different affects may occur when a component of the raw data format undergoes a change.

RGB components associated with each pixel of an image in the RGB format are highly correlated. Specifically, if an R component associated with a pixel is modified, characteristics, such as color and brightness, of the associated pixel are modified. On the contrary, HSV is an uncorrelated domain, where H represents a color component. Specifically, changing the H component only changes the color, while S and V, which represent saturation component and brightness components, respectively, remain unchanged. Similarly in the YUV format, changing the Y component only changes the intensity associated with pixel while color remains intact.

Image-processing devices are provided with an application, such as, for example, an Image Merging application, which enables a preview frame to be displayed in one or more predefined regions of a template image. Such applications require conversion of the template image from a base format to another format for ease of processing. For example, the base format of the predefined region may be a RGB/YUV format and it may be desirable to convert the base format of the predefined region into an HSV format for ease of processing, or vice versa. However, since raw data in the RGB format is highly correlated, extraction of hue information from the raw data in the RGB format is achieved through RGB to HSV conversion, resulting in a non-linear operation. As a consequence, the conversion of the RGB format raw data in the predefined region of the template image into an HSV format may significantly affect performance and requires a long processing time since the conversion operation is non-linear one.

SUMMARY OF THE INVENTION

The present invention has been made to address at least the above problems and/or disadvantages and to provide at least the advantages described below. Accordingly, and aspect of the present invention provides a method and apparatus for generating a multi-format template image.

According to one aspect of the present invention, a method is provided of generating a multi-format template image by an image-processing device. At least one pre-defined region in a template image having a first format is identified. Component information of the at least one pre-defined region is extracted by decoding the template image. Pixels associated with the at least one predefined region are converted from the first format to a second format, with reference to the component information of the at least one pre-defined region, to form the multi-format template image.

According to another aspect of the present invention, an apparatus is provided having a display, a processor, and a memory coupled to the processor. The memory includes an image conversion module that identifies at least one pre-defined region in a template image having a first format. The image conversion module also extracts component information of the at least one pre-defined region by decoding the template image. The image conversion module additionally converts pixels associated with the at least one predefined region from the first format to a second format, with reference to the component information of the at least one pre-defined region, to form the multi-format template image.

According to a further aspect of the present invention, a non-transitory computer-readable storage medium is provided that has instructions stored therein, that when executed by an image-processing device, result in performing a method of generating a multi-format template image by an image-processing device. At least one pre-defined region in a template image having a first format is identified. Component information of the at least one pre-defined region is extracted by decoding the template image. Pixels associated with the at least one predefined region are converted from the first format to a second format, with reference to the component information of the at least one pre-defined region, to form the multi-format template image.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
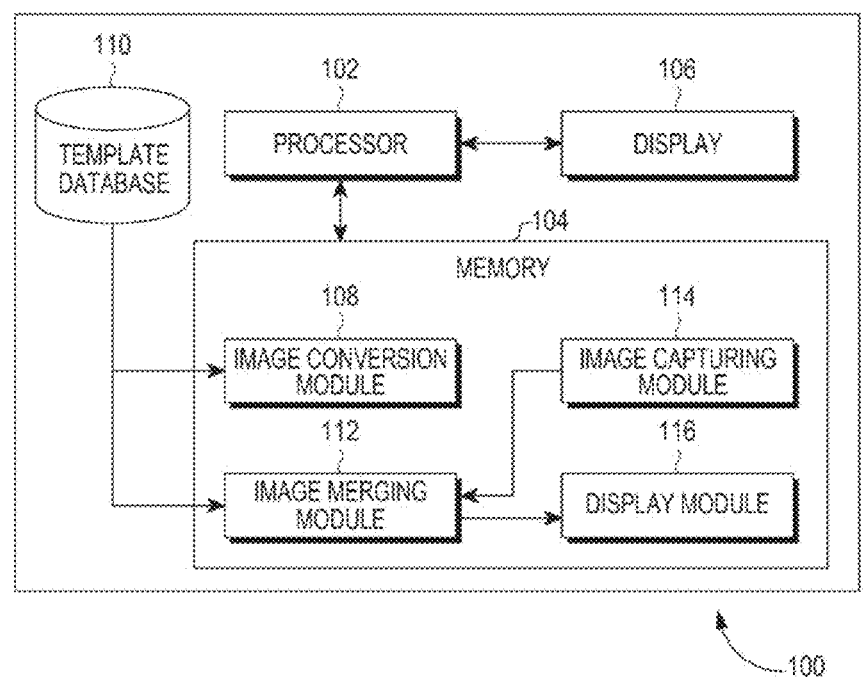
FIG. 1 is a block diagram illustrating an image-processing device for generating a multi-format template image from a single format template image, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a method and system of generating a multi-format template image from a single format template image. The embodiments of the present invention are described in sufficient detail to enable those skilled in the art to practice the invention, and it is to be understood that other embodiments may be utilized and that changes may be made without departing from the scope of the present invention.

FIG. 1 is a block diagram illustrating an image-processing device 100 for generating a multi-format template image from a single format template image, according to an embodiment of the present invention. The image-processing device 100 includes a processor 102, a memory 104, and a display 106. The memory includes an image conversion module 108, a template database 110, an image-merging module 112, an image-capturing module 114, and a display module 116.

The image conversion module 108 is configured to generate a multi-format template image from a single format template image (e.g., RGB, YUV, etc.). In order to generate a multi-format template image, the image conversion module 108 decodes an input template image in a first format. The image conversion module 108 identifies one or more pre-defined regions in the template image and extracts component information of the one or more identified pre-defined regions.

For example, if the template image is an RGB image, color information (e.g., Red, Green, and Blue) in the one or more predefined regions of the template image is obtained. When the one or more predefined regions in the RGB format are to be converted to an HSV format, the image conversion module 108 extracts hue and brightness information of the pixels in the one or more predefined regions in the RGB format. The image conversion module 108 compares the extracted component information (e.g., hue and brightness information) of each of the pixels with the reference component information (e.g., the color information).

Accordingly, the image conversion module 108 converts each of the pixels in the each predefined region in the first format into a second format (e.g., an HSV format, or a YUV format), resulting in a multi-format template image based on comparison of component information. The multi-format template image is stored in a suitable file format in the template database 110.

Figure 3:
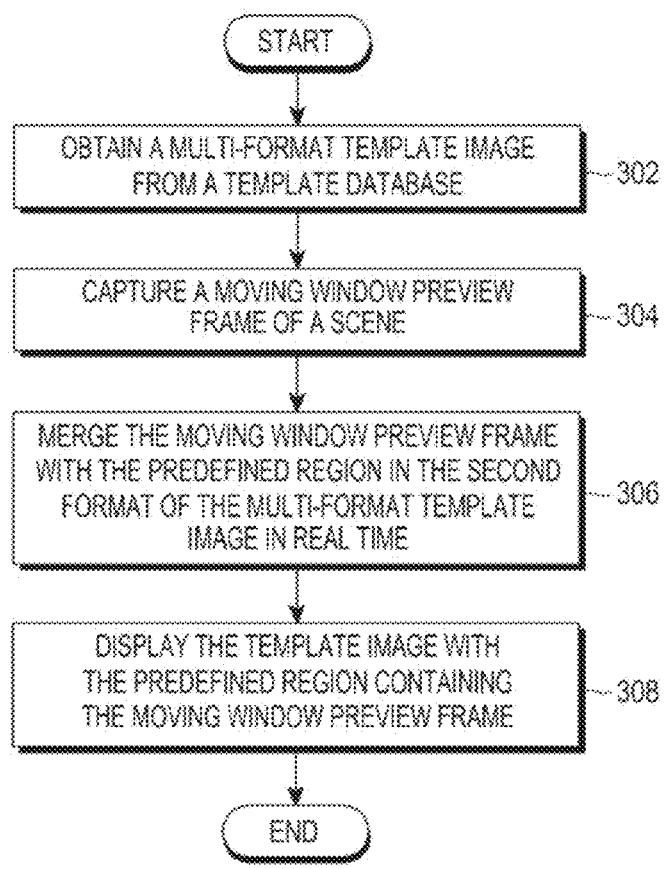
FIG. 3 is a flowchart illustrating a method of merging a picture or an image in one or more predefined regions of the template image to form a new image by the image-processing device, according to an embodiment of the present invention.

The image merging module 112 uses the multi-format template image for merging the one or more predefined regions in the second format with a newly captured moving window preview frame (e.g., captured by the image capturing module 114) or an already captured and stored image of a scene. In an embodiment of the present invention, the multi-format template image is obtained from the template database 110 and the captured moving window preview frame is merged with the one or more predefined regions in the multi-format template image, with reference to the extracted component information. The detailed process of merging the captured preview frame in the one or more pre-defined regions of the multi-format template image, is illustrated in FIG. 3. The display module 116 is configured to display the template image with the one or more predefined regions containing the merged moving window preview frame on the display 106.

Figure 2:
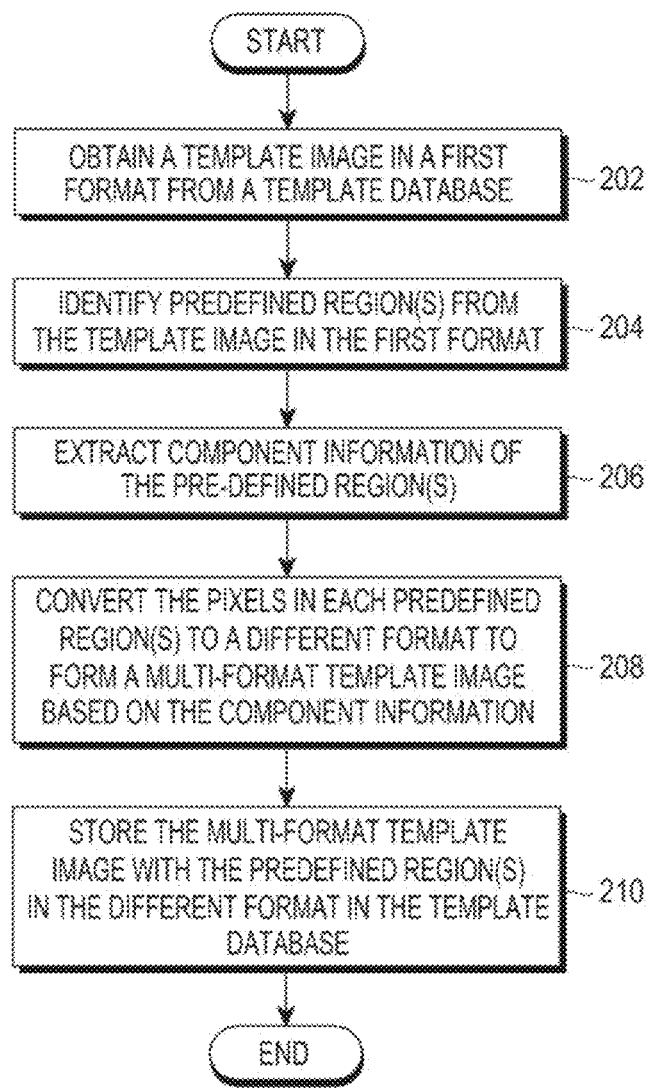
FIG. 2 is a flowchart illustrating a method of generating a multi-format template image from a single format template image by the image-processing device, according to an embodiment of the present invention.

FIG. 2 is a flowchart illustrating a method of generating a multi-format template image from a single format template image by the image-processing device 100, according to an embodiment of the present invention. In step 202, a template image in a first format is obtained from the template database of the image-processing device 100. For example, the template image may be in an RGB format or a YUV format.

In step 204, one or more predefined regions in the template image in the first format are identified. A predefined region in a template image can be a standard shape, such as, for example, rectangular or circular, and can be an irregular shape, which is usually difficult to process. In case of an irregularly shaped predefined region, the predefined region is covered with reference color pixels in a rectangular box, and the rectangular box is referred to as an effective predefined region. This helps maintain uniformity during real-time processing, which further results in saving processing time and optimizing performance.

In step 206, component information of the identified one or more pre-defined regions is extracted by decoding the template image. In step 208, each of the pixels in the one or more predefined regions is converted to a second format based on the extracted component information. In an embodiment of the present invention, the pixels in each predefined region of the template image are converted from the first format to the second format. For example, HSV values may be substituted in place of RGB values for pixels in the one or more pre-defined regions to form a multi-format template image as provided in Equation (1) below.

$$R(PD)=H(PD);$$
$$G(PD)=S(PD); \text{ and}$$
$$B(PD)=V(PD) \quad (1)$$

R, G, and B denote Red, Green and Blue values of a particular pixel in the predefined region (PD), and H, S and V denote Hue, Saturation and Value of the particular pixel in the predefined region (PD).

Alternatively, differences in image values are directly substituted into one of the RGB components, and the other two components are substituted by constants C1 and C2 for identification during real-time processing of the multi-format image as provided in Equation (2) below.

$$R(Pd)=D(\Delta P);$$
$$G(Pd)=C1; \text{ and}$$
$$B(Pd)=C2 \quad (2)$$

$\Delta P$ is the difference in pixel properties, and C1 and C2 are constants.

Similarly, for the YCbCr format, the formulation can change to Equation (3) below.

$$Y(Pd)=D(\Delta P);$$
$$Cb(Pd)=C1; \text{ and}$$
$$Cr(Pd)=C2 \quad (3)$$

$\Delta P$ is the difference in pixel properties, and C1 and C2 are constants.

Thus, in the manner described above, a multi format template image including the non-predefined region in the first format and the one or more predefined regions in the second format is obtained, after step 208. In step 210, the multi-format template image is stored in the template database 110 of the image-processing device 100 for further processing. In an embodiment of the present invention, the multi-format image can be used by the image merging application in the image-processing device 100 for merging a picture or an image in the one or more pre-defined regions in the second format, as illustrated in FIG. 3.

FIG. 3 is a flowchart illustrating a method of merging a picture or an image in the one or more predefined regions of the template image to form a new image by the image-processing device 100, according to an embodiment of the present invention. In step 302, the multi-format template image, which includes the one or more predefined regions in the second format, is obtained from the template database 110. In step 304, a moving window frame of a scene is captured using the image-processing device 100. Step 304 is optionally performed when the merging process is implemented in the image-processing device 100, such as, for example, a camera.

In step 306, the captured moving window preview frame is merged with the one or more predefined regions in the multi-format template image in real-time, with reference to the extracted component information. In an embodiment of the present invention, when the one or more pre-defined regions are in an HSV format and the non-predefined region is in an RGB format, an RGB value of each pixel of the moving window preview frame is matched with hue information of a corresponding pixel in the one or more predefined regions in the second format. Variation in intensity between each pixel of the preview frame and the corresponding pixel in the one or more predefined regions is computed based on the brightness information of the corresponding pixel in the one or more predefined regions in the first format. Accordingly, each pixel of the moving window preview frame is modified by applying a computed intensity variation and corresponding color information to each pixel of the moving window preview frame. Each pixel in the one or more predefined regions in the multi-format template image is merged with the corresponding modified pixel of each moving window preview frame.

In step 308, the template image with the one or more predefined regions containing the merged moving window preview frame is displayed on the display of the image-processing device 100. When the above merging process is implemented in the image-processing device 100, such as, for example, a mobile phone or a personal computer, an image pre-stored in the image-processing device 100 is fetched from the memory for merging with the one or more predefined regions in step 304. One skilled in the art recognizes that the methodologies described in FIGS. 2 and 3 can be implemented in various types of image-processing devices that are known in the art.

Figure 4A:
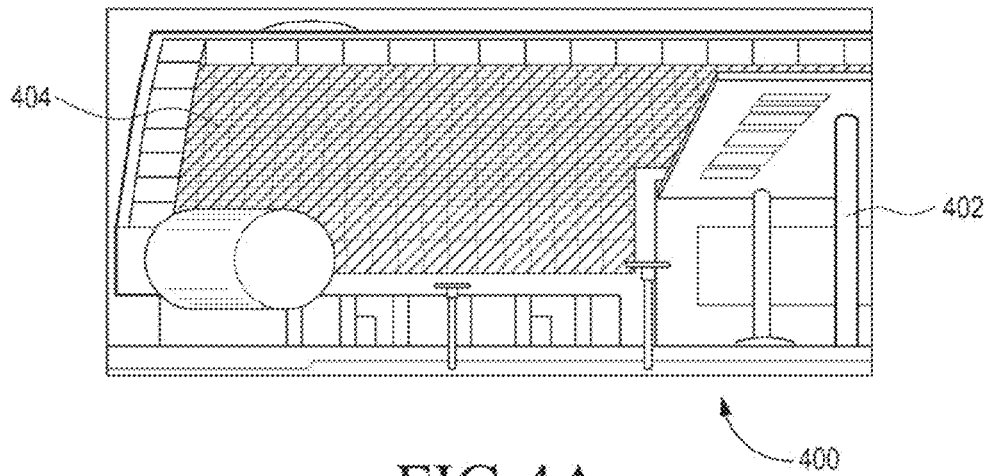
FIGS. 4A and 4B are schematic representations illustrating a template image with a predefined region in a first format and a template image with predefined region converted to a second format, according to an embodiment of the present invention.
Figure 4B:
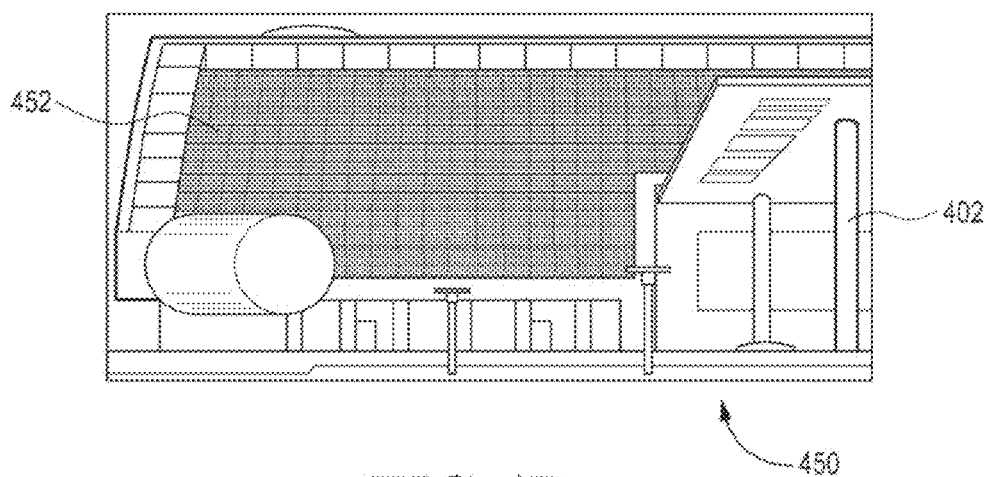

FIGS. 4A and 4B are schematic representations illustrating a template image 400 with a predefined region 404 in a first format and a dual-format template image 450 with a converted predefined region 452 in a second format, according to an embodiment of the present invention. As shown in FIG. 4A, the template image 400 includes a predefined region 404 and a non-predefined region 402, both having the same format (e.g., RGB or YUV format). Upon conversion of the template image 400 using the methodology of FIG. 2, the dual format template image 450 is obtained with the predefined region 452 converted to a second format (e.g., HSV or YUV format), as illustrated in FIG. 4B. The non-predefined region 402 is retained in the first format.

Figure 5A:
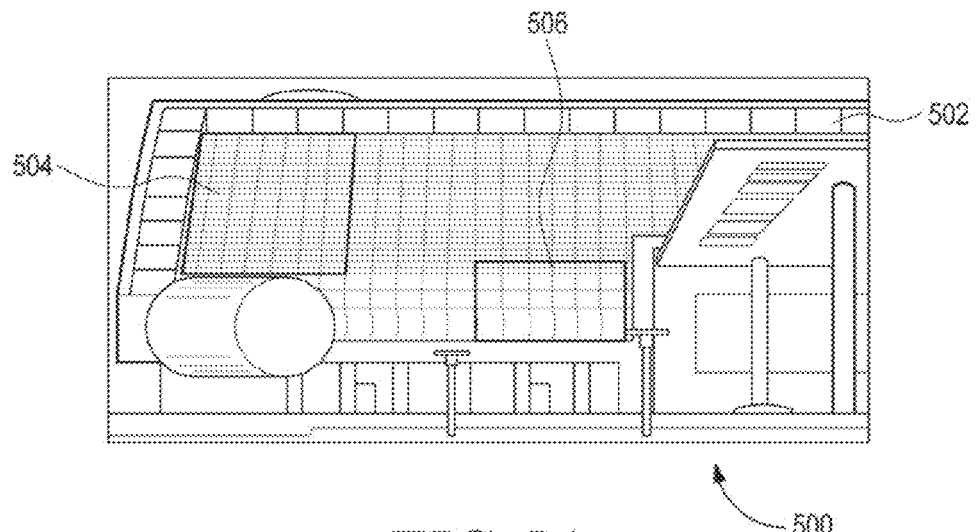
FIGS. 5A and 5B are schematic representations illustrating a template image with predefined regions in a first format and the template image with the predefined regions converted to different formats, according to another embodiment of the present invention.
Figure 5B:
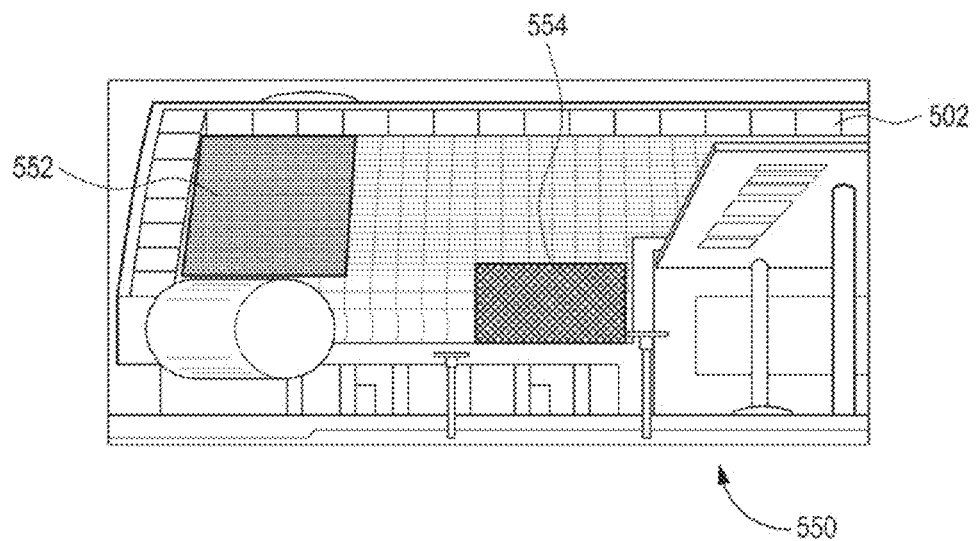

FIGS. 5A and 5B are schematic representations illustrating a template image 500 with predefined regions 504 and 506 in a first format and a multi-format template image 550 in the first format with the predefined regions 504 and 506 converted to different formats, according to another embodiment of the present invention. As shown in FIG. 5A, the template image 500 includes predefined regions 504 and 506, and a non-predefined region 502, all having the same format (e.g., RGB format). Upon conversion of the template image 500 using the steps of FIG. 2, the multi-format template image 550 is obtained with the predefined regions 552 and 554 converted to an HSV format and a YUV format, respectively, as illustrated in FIG. 5B. The non-predefined region 502 is retained in the RGB format.

The various devices, modules, selectors, estimators, and the like, described herein may be enabled and operated using hardware circuitry, for example, complementary metal oxide semiconductor based logic circuitry, firmware, software and/or any combination of hardware, firmware, and/or software embodied in a machine readable medium. For example, the various electrical structures and methods may be embodied using transistors, logic gates, and electrical circuits, such as, for example, an application specific integrated circuit.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of generating a multi-format template image by an image-processing device, the method comprising the steps of:
   identifying at least one pre-defined region in a template image having a first format;
   extracting component information of the at least one pre-defined region by decoding the template image; and
   converting pixels associated with the at least one pre-defined region from the first format to a second format, with reference to the component information of the at least one pre-defined region, to form the multi-format template image.

2. The method of claim 1, wherein the first format of the template image is selected from a group consisting of a Red Green Blue (RGB) format, a Hue, Saturation and Value (HSV) format, and YUV format.

3. The method of claim 1, wherein the second format of the pixels associated with the at least one predefined region is selected from a group consisting of an HSV format, an RGB format, and a YUV format.

4. The method of claim 1, further comprising:
   storing the multi-format template image in a memory of the image-processing device.

5. The method of claim 4, further comprising:
   obtaining the multi-format template image stored in the memory of the image-processing device;
   capturing a moving window preview frame of a scene using the image-processing device;
   merging the captured moving window preview frame with the at least one predefined region in the multi-format template image in real-time with reference to the component information; and
   displaying a template image with the at least one pre-defined region comprising the merged moving window preview frame, on a display of the image-processing device.

6. An apparatus comprising:
   a display;
   a processor; and
   a memory coupled to the processor;

wherein the memory comprises an image conversion module for:
- identifying at least one pre-defined region in a template image having a first format;
- extracting component information of the at least one pre-defined region by decoding the template image; and
- converting pixels associated with the at least one pre-defined region from the first format to a second format, with reference to the component information of the at least one pre-defined region, to form the multi-format template image.

7. The apparatus of claim 6, wherein the first format of the template image is selected from a group consisting of a Red Green Blue (RGB) format, a Hue, Saturation and Value (HSV), format and a YUV format.

8. The apparatus of claim 6, wherein the second format of the pixels associated with the at least one predefined region is selected from the group consisting of an HSV format, an RGB format, and a YUV format.

9. The apparatus of claim 6, further comprises a template database for storing the multi-format template image.

10. The apparatus of claim 9, wherein the memory comprises an image-capturing module for capturing a moving window preview frame of a scene.

11. The apparatus of claim 10, wherein the memory further comprises an image-merging module for:
- obtaining the multi-format template image from the template database; and
- merging the captured moving window preview frame with the at least one predefined region in the multi format template image in real-time with reference to the component information.

12. The apparatus of claim 11, wherein the memory further comprises a display module for displaying a template image with the at least one predefined region comprising the merged moving window preview frame on the display.

13. A non-transitory computer-readable storage medium having instructions stored therein, that when executed by an image-processing device, result in performing a method of generating a multi-format template image by an image-processing device, the method comprising:
- identifying at least one pre-defined region in a template image having a first format;
- extracting component information of the at least one pre-defined region by decoding the template image; and
- converting pixels associated with the at least one pre-defined region from the first format to a second format, with reference to the component information of the at least one pre-defined region, to form the multi-format template image.

14. The storage medium of claim 13, wherein the first format of the template image is selected from a group consisting of a Red Green Blue (RGB) format, a Hue, Saturation and Value (HSV) format, and a YUV format.

15. The storage medium of claim 13, wherein the second format of the pixels associated with the at least one predefined region is selected from a group consisting of an HSV format, an RGB format, and a YUV format.

16. The storage medium of claim 13, wherein the method further comprises:
- storing the multi format template image in a memory of the image-processing device.

17. The storage medium of claim 16, wherein the method further comprises:
- obtaining the multi format template image stored in the memory of the image-processing device;
- capturing a moving window preview frame of a scene using the image-processing device;
- merging the captured moving window preview frame with the at least one predefined region in the multi format template image in real-time with reference to the component information; and
- displaying a template image with the at least one pre-defined region comprising the merged moving window preview frame, on a display of the image-processing device.

* * * * *